No. 751,428. Patented February 2, 1904.

UNITED STATES PATENT OFFICE.

ALBERT BUSCH, OF BRUNSWICK, GERMANY, ASSIGNOR TO BAUER & CIE., OF BERLIN, S. W. GERMANY.

PROCESS OF MAKING WATER-SOLUBLE ALBUMINOUS COMPOUNDS.

SPECIFICATION forming part of Letters Patent No. 751,428, dated February 2, 1904.

Original application filed May 26, 1903, Serial No. 158,767. Divided and this application filed September 17, 1903. Serial No. 173,537.

(No specimens.)

*To all whom it may concern:*

Be it known that I, ALBERT BUSCH, a subject of the Duke of Brunswick, residing at Brunswick, in the Duchy of Brunswick, German Empire, have invented a new and useful Process of Manufacturing Water-Soluble Albuminous Compounds, of which the following is a specification.

This application is a division of my prior United States application, filed May 26, 1903, Serial No. 158,767.

I have found that salts, and in particular alkali salts of mannite-phosphoric acid, (for preparation of which compare Portes et Prumier, *Journ. de Pharm. et de Chimie*, 6, 16, 457, and Carré, *Comptes rendus* 136, (1903,) page 306,) have the property of rendering certain albuminous compounds—for instance, casein, both animal and vegetable—and alkali-albuminate water soluble to a considerable extent. Instead of salts, and in particular alkali salts of mannite-phosphoric acid, those of dulcite-phosphoric acid and sorbite-phosphoric acid may be used to the same purpose and with the like effect. Dulcite and sorbite phosphoric acids will have to be prepared in the same manner described with reference to the manufacture of the mannite-phosphoric acid. (Compare statement above.)

The new preparations contain carbohydrates chemically bound to phosphoric acid and in close combination with albuminous compounds, and being readily absorbed by the human system they are exceedingly apt for nutritive purposes, so that they form a superior diatetic food.

In order still more explicitly to show the nature of my invention and to illustrate the manner in which it is carried out, I now give a working prescription, but by way of example only and in no way restricting myself to these special directions. Ninety-five parts of casein are mixed with ten parts of a fifty-per-cent. solution of di-sodium mannite-phosphate (for preparation compare citation above) held in suspension in an aqueous or alcoholic liquid, and then the mixture is dried at as low a temperature as possible and preferably *in vacuo*. If alkali albuminate is used, the proportions are just the same. The ground product swells up in cold water and dissolves on heating the same. The preparation of the other combinations—viz., with dulcite-phosphate or sorbite-phosphate—may be effected in an analogous manner.

Instead of alcohol other liquids having no effect on the materials used, such as ether acetone and so on, may be used. Instead of casein, both animal and vegetable, alkali-albuminate may be used also.

The underlying principle of my invention having been precisely set forth in the above description it is obvious that the proportions given may be varied within certain limits without deviating from the principle of the invention itself, which in general consists in converting the above-mentioned albuminous compounds by combination with salts, and with alkali salts in particular, of the above-described organic combinations with phosphoric acids into a water-soluble form of greater absorbing capacity.

What I claim now, and desire to secure by Letters Patent of the United States of America, is—

A process of manufacturing water-soluble albuminous food compounds which consists in combining albuminous compounds insoluble in water but soluble in alkali with alkali salts of hexite-substituted phosphoric acids, substantially as specified.

In witness whereof I have hereunto signed my name in the presence of two subscribing witnesses.

ALBERT BUSCH.

Witnesses:
 PAUL GRIESE,
 MAX MÜLLER.